United States Patent
Liechty

(10) Patent No.: US 11,054,502 B2
(45) Date of Patent: Jul. 6, 2021

(54) METHOD AND SYSTEM FOR INTRA-PULSE FREQUENCY ESTIMATION AGAINST AGILE EMITTERS

(71) Applicant: MERCURY SYSTEMS, INC., Andover, MA (US)

(72) Inventor: Robert Liechty, Marion, IA (US)

(73) Assignee: Mercury Systems, Inc., Andover, MA (US)

( * ) Notice: Subject to any disclaimer, the term of this patent is extended or adjusted under 35 U.S.C. 154(b) by 323 days.

(21) Appl. No.: 16/046,508

(22) Filed: Jul. 26, 2018

(65) Prior Publication Data
US 2021/0165087 A1 Jun. 3, 2021

(51) Int. Cl.
G01S 7/41 (2006.01)
G01S 7/292 (2006.01)

(52) U.S. Cl.
CPC ........... *G01S 7/41* (2013.01); *G01S 7/292* (2013.01)

(58) Field of Classification Search
CPC .......... G01S 7/021; G01S 7/292; G01S 7/352; G01S 7/354; G01S 7/36; G01S 7/41; G01S 7/411; G01S 7/412; G01S 7/415; G01S 13/52–13/534; G01S 7/414
See application file for complete search history.

(56) References Cited

U.S. PATENT DOCUMENTS

| | | | | |
|---|---|---|---|---|
| 4,137,532 A * | 1/1979 | Taylor, Jr. | ........... | G01S 13/5248 342/137 |
| 4,339,754 A * | 7/1982 | Hammers | ........... | G01S 13/52 342/16 |
| 5,418,536 A * | 5/1995 | Lisle | ........... | G01S 13/5244 327/44 |
| 5,430,445 A * | 7/1995 | Peregrim | ........... | F41G 7/343 342/25 C |
| 6,215,115 B1 * | 4/2001 | Baker | ........... | G01S 3/7864 250/214 C |
| 9,866,422 B1 * | 1/2018 | Ray | ........... | G06K 9/0053 |
| 9,991,908 B2 * | 6/2018 | Ray | ........... | G01S 7/021 |
| 2004/0178943 A1 * | 9/2004 | Niv | ........... | G01S 13/50 342/29 |
| 2007/0229353 A1 * | 10/2007 | Mueller | ........... | G01S 3/14 342/378 |
| 2013/0021197 A1 * | 1/2013 | Jiang | ........... | G01S 7/021 342/195 |
| 2013/0129026 A1 * | 5/2013 | Petersen | ........... | G01S 11/08 375/371 |

(Continued)

*Primary Examiner* — Peter M Bythrow
(74) *Attorney, Agent, or Firm* — Kacvinsky Daisak Bluni PLLC

(57) ABSTRACT

A radar detection system that estimates the received pulse frequency of a pulse in a received radar signal using a signal transmit frequency or one that uses frequency agility during a pulse duration. The radar detector system may include a radar detector that receives the radar signal from an antenna or antenna array. The receiver may be channelized, and each channel path may include Gaussian bandpass filter(s) centered at a different frequencies. The system includes an extended range radar detector that receives the signal in the channels and processing logic that processes the detected channel signals to identify the pulse frequency of emitters with or without frequency agility during a pulse duration. The frequency estimates of the pulse are based on calibrated amplitude differences in adjacent channels.

17 Claims, 12 Drawing Sheets

(56) References Cited

U.S. PATENT DOCUMENTS

| | | | |
|---|---|---|---|
| 2013/0230206 A1* | 9/2013 | Mendez-Rodriguez | ..................... G06K 9/0063 382/103 |
| 2013/0300460 A1* | 11/2013 | Gabbay | ................... G06F 1/025 327/107 |
| 2014/0247968 A1* | 9/2014 | Pavlic | ................. G06K 9/6267 382/104 |
| 2014/0333475 A1* | 11/2014 | Sierwald | ............... G01S 13/951 342/26 R |
| 2015/0323650 A1* | 11/2015 | Schuman | ............... H04K 3/228 342/17 |
| 2016/0282457 A1* | 9/2016 | Mazzaro | ............... G01S 13/106 |
| 2017/0307728 A1* | 10/2017 | Eshraghi | ............... G01S 13/931 |

\* cited by examiner

METHOD AND SYSTEM FOR INTRA-PULSE FREQUENCY ESTIMATION AGAINST AGILE EMITTERS

BACKGROUND OF THE INVENTION

With traditional radar systems, short pulses of radar energy at a specific frequency are emitted towards a target from a radar emitter. The radar emitter then is turned off so that the system may listen for returning echoes. More recently, frequency agility radar systems have come into use. Frequency agility refers to the ability of a radar system to quickly shift its operating frequency and not operate at a single pulse frequency during a pulse duration. This shift helps to avoid jamming and makes it more difficult to locate the radar emitters using direction detection and avoids radar identification and classification.

SUMMARY

In accordance with an exemplary embodiment, a method for detecting the frequency of a radar pulse transmission from a radar emitter is performed. The method includes receiving the radar signal containing the pulse at a receiver. The received signal is divided into channels at the receiver. A respective Gaussian bandpass filter is applied to the signal in each channel to yield a filtered signal in each channel. Each Gaussian bandpass filter is centered at a different frequency from the other Gaussian bandpass filters. For at least two of the channels, the pulse is detected in the filtered signals in the channels. This detection includes amplitude detection of the pulse that has been filtered by the Gaussian filter channels. Based on the detected amplitude differences of the pulse(s) in at least two channels, the arriving frequency of the pulse of a radar receiver can be estimated.

The method may include obtaining a difference amplitude value from a lookup table that directly correlates to an estimate the radar's pulse frequency in a linear manner. Alternatively, the estimating may comprise estimating the pulse frequency with the processor that is programmed to perform the estimating.

The method may estimate the pulse width and pulse amplitude of the pulse and may generate a pulse descriptor word for the pulse due to the processing method. Still further, for radar signals using broadband linear and non-linear frequency modulation (LFM and NLFM) this method may determine an estimate of the instantaneous bandwidth of a pulsed LFM radar emitter.

In accordance with an exemplary embodiment, a radar detection system is provided. The radar detection system includes a channelized radar receiver for receiving an input radar signal having a pulse transmission. The receiver divides the input radar signal into channels. Each channel has a path containing a Gaussian bandpass filter where each of the Gaussian bandpass filters for the channels is centered at a different frequency. The radar detection system also includes an amplitude detector for detecting amplitude of the received signal in the Gaussian channels and produces a log video output. The radar detection system may include processing logic for receiving the log video output from the detector and detecting amplitudes of the pulses in the channels. The processing logic calculates the amplitude differences of the detected pulses in the different channels and selects the highest amplitude channels. Based on the amplitude differences in the detected pulses in the different channels, the processing logic estimates the frequency of the pulse in the received input radar signal by using a calibrated look-up table that correlates amplitude difference to frequency between channels. This method can be used to sample the amplitude difference at the beginning, middle, and trailing edge of the pulse to determine if the radar emitter is using a constant frequency or is using frequency agility (Intra-pulse modulation) during the pulse transmission.

The processing logic may include for example, a field programmable gate array, an application specific circuit, a microprocessor, a digital signal processor or electronic circuitry.

The radar detection system may include a high pass filter for filtering the input radar signal and/or a limiter that is applied to the input radar signal. The detector may include at least two (2) successive detection log video amplifiers (SDLVA) to measure the difference in amplitude channels.

DETAILED DESCRIPTION

The exemplary embodiments described herein provide for intra-pulse frequency estimation against agile emitters. The exemplary embodiments provide rapid estimation of the frequency of a pulse in a received radar signal that may use or may not use frequency agility during a pulse transmission. The exemplary embodiments provide a much quicker response than conventional systems that attempt to perform instantaneous frequency estimation that exhibit a pulse-on-pulse condition. In the exemplary embodiments, the intra-pulse frequency estimation is performed rapidly and may be used for threat warning and cueing of electronic warfare (EW) resources to the proper frequency to enhance the response and the accuracy. The exemplary embodiment may also accurately measure the pulse width and pulse amplitude of the pulse of the received radar signal. A short pulse descriptor word (PDW) for the radar event may be provided for use for downstream processing, signal convergence, as well as pulse sorting of sophisticated radar emitters.

The exemplary embodiments may be used for threat warning and cueing of electronic warfare resources to the proper frequency to enhance the response and accuracy of a digital radio frequency memory (DRFM) subsystem, thereby improving mission effectiveness and electronic attack management.

In addition, the early sensor awareness in the sensor chain provided by exemplary embodiments can help with pulse sorting methods to classify out of library signal sets in a contested environment.

Exemplary embodiments herein provide Gaussian bandpass filters centered at different frequencies for respective channels in a radar receiver. Since the response to the Gaussian filter varies over frequency (i.e., automation varies over frequency), the difference in amplitudes between the pulses of the filtered signals of the respective channels (highest amplitude in adjacent channels) may be used to determine the frequency of the received pulse in the received radar signal. The amplitude differences of the pulses are indicative of a frequency offset that may be used to identify the frequency of the detected pulse in the input radar signal. The frequency estimate can be done at the leading edge, middle, and trailing edge of the pulse to detect frequency agility and estimated bandwidth of a LFM radar signal.

Unlike other technologies that rely upon instantaneous frequency measurements, the exemplary embodiments accurately predict the frequency against an agile emitter during a pulse duration. Conventional systems often produce erroneous readings during a pulse-on-pulse condition at different frequencies and cannot resolve frequency or detect frequency agility during a pulse transmission.

Figure 1:
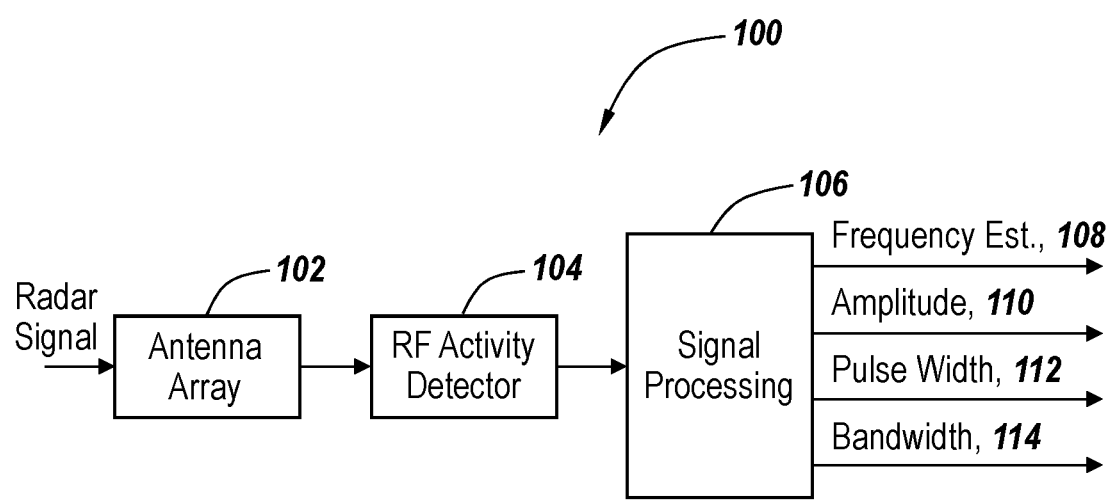
FIG. 1 depicts a block diagram of a radar detection system in accordance with an exemplary embodiment.

FIG. 1 depicts a high level block diagram of a radar detection system 100 in accordance with an exemplary embodiment. As shown in FIG. 1, a radar signal is received by an antenna array or antenna 102. The antenna array 102 may take many different forms. It is expected that the number of detector elements in the antenna array 102 and the configuration of the detector elements may vary.

The antenna array 102 provides an output radio frequency (RF) signal to the RF activity detection component 104. The RF activity detection component 104 is responsible for receiving the radar signal from the antenna array 102, processing the radar signal to identify the pulse in channels and passing the resulting video outputs to the signal processing component 106. The signal processing component 106 contains processing logic that processes the video outputs to generate a number outputs. The outputs are digitized and processed. The outputs may include, as shown in FIG. 1 and the number of outputs can vary depending on the instantaneous frequency coverage, a frequency estimate 108 for a received pulse. The outputs may also include the amplitudes of pulses that are received. For any given pulse, the pulse width 112, may be outputted as well. In addition, the signal processing 106 may output the instantaneous bandwidth 114 of the received signal using LFM techniques. An intra-pulse activity flag 116 may be produced to indicate that there is a frequency agility in use. The processing that is performed to generate these outputs will be described in more detail below.

Figure 2:
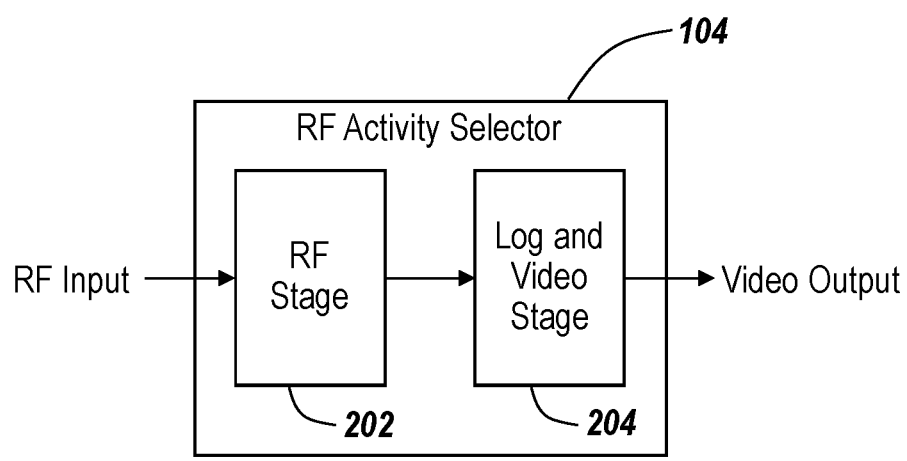
FIG. 2 is a block diagram showing more detail for the radio frequency (RF) activity detection components of the radar detection system.

FIG. 2 shows a block diagram illustrating in more detail the stages that are provided in the RF activity detection component 104 (FIG. 1). The RF activity detection component 104 includes an RF stage 202 that receives the RF input from the antenna or antenna array. This stage 202 processes the input and passes the resulting output to a successive detection log video amplifier (SLDVA) and video conditioner stage 204, which contains a log detector that produces a video output of detected radar pulses or CW signals.

Figure 3:
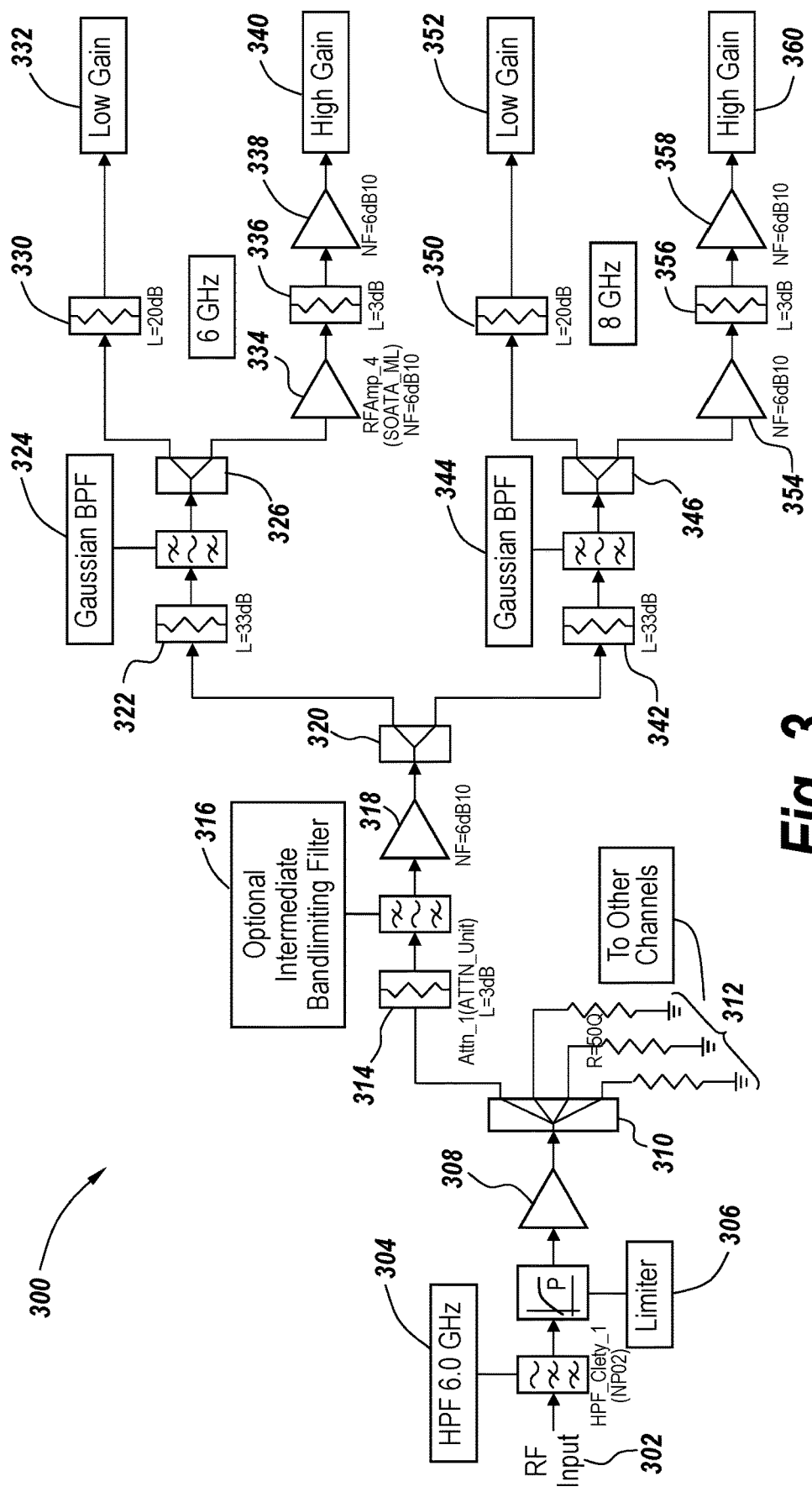
FIG. 3 shows the RF stage of the RF activity detection component in more detail supporting an extended range SLDVA for low sensitivity detection.

FIG. 3 shows a diagram of a suitable implementation of the RF stage 202. The RF stage 300 shown in FIG. 3 is a channelized receiver. The RF input 302 (i.e., the radar signal from the antenna or antenna array 102) is received and passed through a high pass filter 304 to removed unwanted lower frequency signals. In the example of FIG. 3, frequencies below 6 gigahertz are rejected so as to reject lower frequency input signals that may cause harmonic interference in band and more generally to band limit the input. It is assumed, for purposes of the discussion the exemplary component shown in FIG. 3, that the input is a single wide band antenna input that may contain components in the range between 6 and 18 gigahertz. The present invention, however, is not limited to such a frequency range and is extensible to lower microwave and mmW frequency ranges. The filtered input is then passed through a limiter 306. The limiter 306 is a low loss limiter that is used to protect low noise amplifier 308. The low noise amplifier 308 is a low noise device that may set the noise figure for the system to be less than or equal to 4 or 5 decibels typically.

A power divider 310 is provided to divide the wideband signal into four pieces that will be further divided into channels. In the exemplary embodiments, seven channels are used. The channels are configured like the two channels depicted in detail in FIG. 3. As will be described in more detail below, each channel includes a Gaussian bandpass filter that is centered at a unique frequency.

As shown in FIG. 3, for two channels, the channel signal may be passed through an attenuator 314 and then an optional band limiting filter 316 to perform intermediate band limiting at the outputs of the power divider 310 that limits out of band interference. An amplifier signal 318 receives the filtered output and outputs the amplified signal to a power divider 320. The power divider 320 divides the signal into respective signals for two channels. For each channel, an attenuator 322 may be provided to set the appropriate power level for a Gaussian bandpass filter 324. The Gaussian filter 224 is centered at 6 gigahertz. The resulting filtered channel signal is then divided by divider 326 into a low gain output path and a high gain output path. The low gain output path include an attenuator 330 adjusting the power level of the low gain output 332 to a level suited for the extended range SLDVA detector. The high gain path may include a gain component 334, an attenuator 336 and another gain 338 to generate the high gain output 340. The high gain path is used to set a signal with an acceptable logging range. The low gain output 332 and the high gain output 340 are passed to the SLDVA detector and video conditioner stage 204 (FIG. 2).

The other channel includes a Gaussian bandpass filter 344 that is centered at 8 gigahertz. Thus, there is a 2 gigahertz separation between the channels. The frequency separation is chosen for the desired instantaneous frequency measurement without declaring a new pulse activity during frequency agility of a given pulse duration. The slope and roll-off of the filters are set for desired frequency accuracy and this plays a part in the overall RF sensitivity and detection of weak signals.

Like the 6 gigahertz channel path described above, this channel path includes similar components, including attenuators 342, 350 and 356, a power divider 346 as well as a gain components 354 and 358. This channel path produces a low gain output 352 and a high gain output 360 that are passed to the SDLVA detector, as will be described in more detail below.

Figure 4:
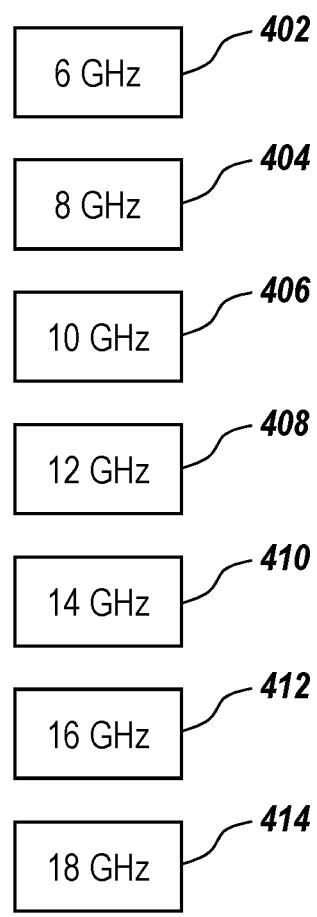
FIG. 4 depicts an example of a numerous channels that may be utilized in the exemplary embodiment.

FIG. 4 shows an example of the various channels that may be used in the exemplary embodiments described herein. In this example, the instantaneous bandwidth is 6-18 GHz. This technique may be extended to mmW and lower microwave frequencies covering 0.5-6 GHz as well. In this illustrative example, the channels 400, include a 6 gigahertz channel 402, an 8 gigahertz channel 404, a 10 gigahertz channel, a 12 gigahertz channel 408, a 14 gigahertz channel 410, a 16 gigahertz channel 412 and an 18 gigahertz channel 414. These channels are defined by where the Gaussian bandpass filter for each channel is centered. Those skilled in the art will appreciate that this channel assignment is intended to merely illustrative and not limiting of the claimed invention and can be adjusted for frequency accuracy and pulse sensitivity. Different number of channels may be used and they may be centered at different frequencies.

Figure 5:
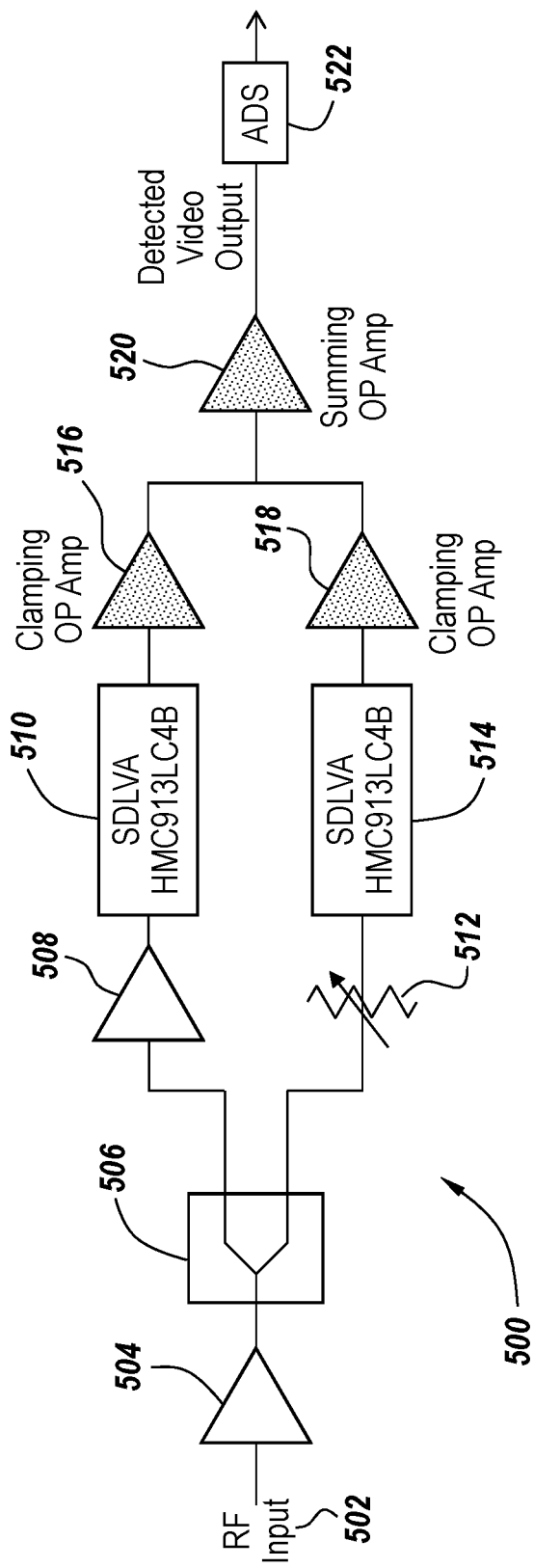
FIG. 5 depicts components of the extended range log video detector and video stage amplifier of the RF activity detection component in more detail.

FIG. 5 shows the components of the SLDVA and video conditioner stage 204 (FIG. 2) in more detail. The stage 204 includes two SDVLAs 510 and 514 that act as the log video detectors. As was mentioned above, the high gain and low gain outputs from the respective channels are fed into the SDVLAs 510 and 514. Some of the components shown in FIG. 5 overlap with those shown in FIG. 3.

In the configurations shown in FIG. 5, there are two paths: a high gain path and a low gain path. The high gain path is used for low signal levels and provides a gain to put the signal within acceptable logging range for the SDVLA 510 or 514. In the depiction in FIG. 5, the RF input 502 is passed to gain component 504 and then to a splitter 506. One output of the splitter 506 leads to the high gain path having SDVLA 510, and the other output leads to a low gain path that includes SDVLA 514. The low gain path is used for a signals that do not require further amplification in order to be within the logging range of one of the SDVLAs. A variable attenuator 512 may adjust the input level in the low gain path leading to SDVLA 514. Clamping OP amps 516 and 518 are provided at the outputs of the SDVLAs 510 and 514 to adjust the clamping levels of the output from the high gain path and the output from the low gain path. A summing OP amp 520 sums the outputs from the high gain path and the low gain path to produce the video output. The video output is a summation of the video output from the high gain path and the low gain path. This may be passed through an analog to digital converter (ADC) 522 to produce a digital output that is passed to the signal processing component 106.

In this fashion, the SDVLAs act as increased range log detectors for detecting the weak RF inputs 502 from the receiver, as shown in FIG. 3 for the respective channels. The SDVLAs produce a video output that may be used by the signal processing component as will be described in more detail below.

Figure 6:
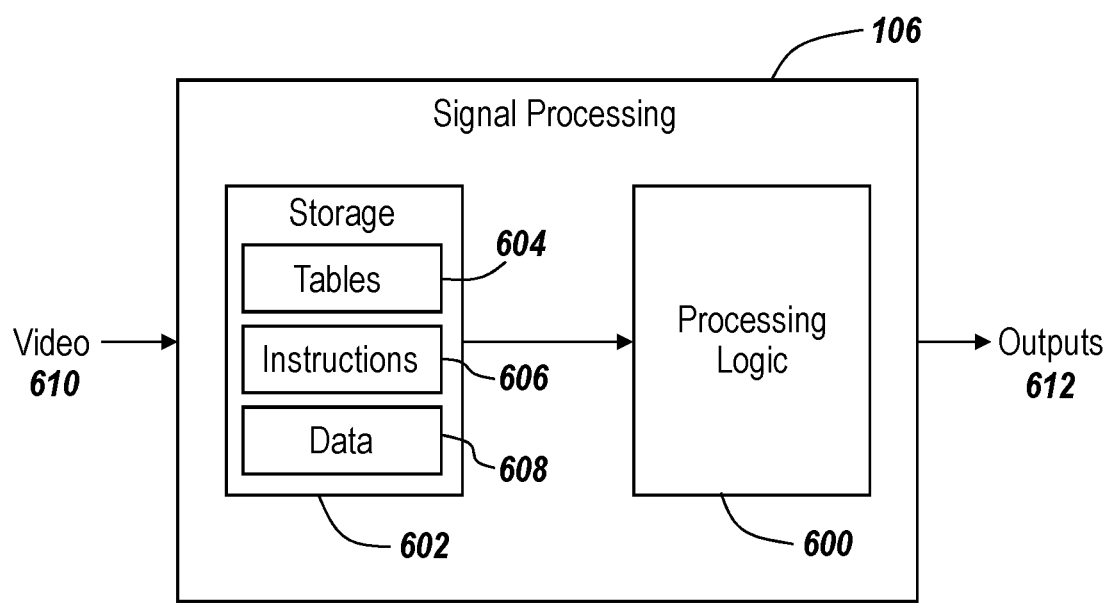
FIG. 6 is a block diagram showing more detail of the signal processing component of the radar detection system.

FIG. 6 shows an example of a block diagram for the signal processing component 106. As can be seen, the signal processing component 106 includes processing logic 600 and a storage 602. The storage 602 may hold items, such as lookup tables 604, executable instructions 606 stored on a computer readable medium or other forms of data to include temporary storage 608. The storage may hold processing criteria 609 that is used by the processing logic 600. The signal processing component 106 receives the video output from the RF activity detection component 104 and processes that video outputs to generate the outputs 612, like outputs 108, 110, 112 and 114 shown in FIG. 1.

Figure 7:
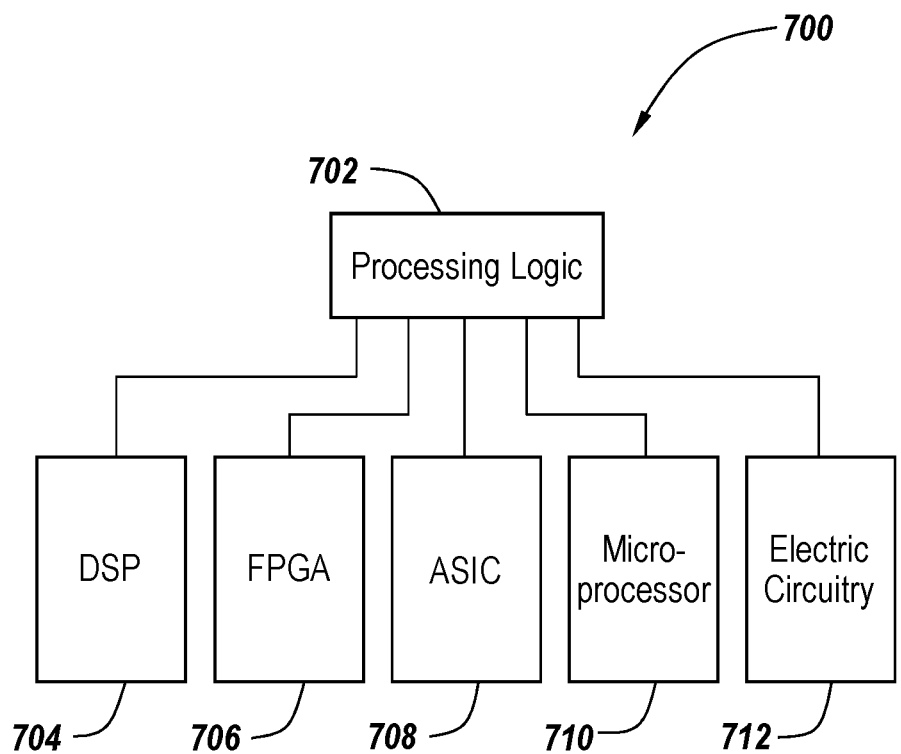
FIG. 7 is a diagram depicting various types of processing logic that may be utilized in exemplary embodiments.

The processing logic 600 may take many forms. As shown in the diagram 700 of FIG. 7, the processing logic 702 may include a digital signal processor (DSP) 704. Alternatively, the processing logic may include a field programmable gate array (FPGA) 706 or an application specific integrated circuit (ASIC) 708. Still further, the processing logic 702 may include a microprocessor 710 or electric circuitry 712. In general, the processing logic 600 may take many different forms that can provide the requisite functionality and that may be best suitable for a particular application.

Figure 8:
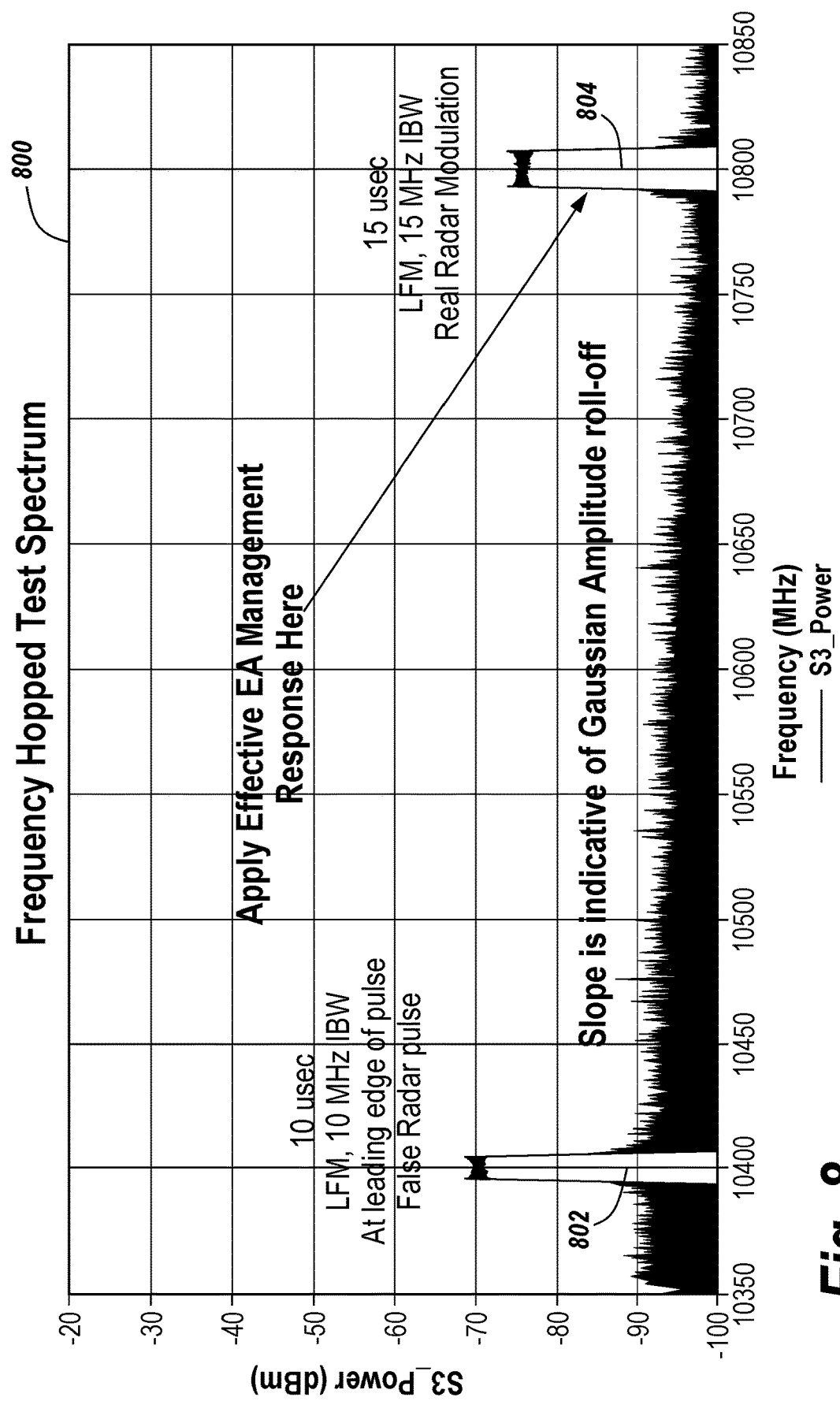
FIG. 8 shows an example of a plot of a portion of a received linear frequency modulation (LFM) radar signal in the frequency domain that has intra-pulse modulation during the pulse duration.

FIG. 8 shows an example of an LFM radar signal with a total transmit width of 25 microseconds. The depiction in FIG. 8 is in the frequency domain. In the example shown in FIG. 8, the plot 800 includes a false pulse 802 and a real pulse 804. These pulses are at different frequencies. Exemplary embodiments are able to detect the frequency of the pulses and report that information quickly so that an appropriate electronic attack response may be generated quickly and effectively at the correct radar signal doing the measurement. If the instantaneous LFM bandwidth is large enough, a good estimate of the bandwidth can be made using this processing technique.

Figure 9:
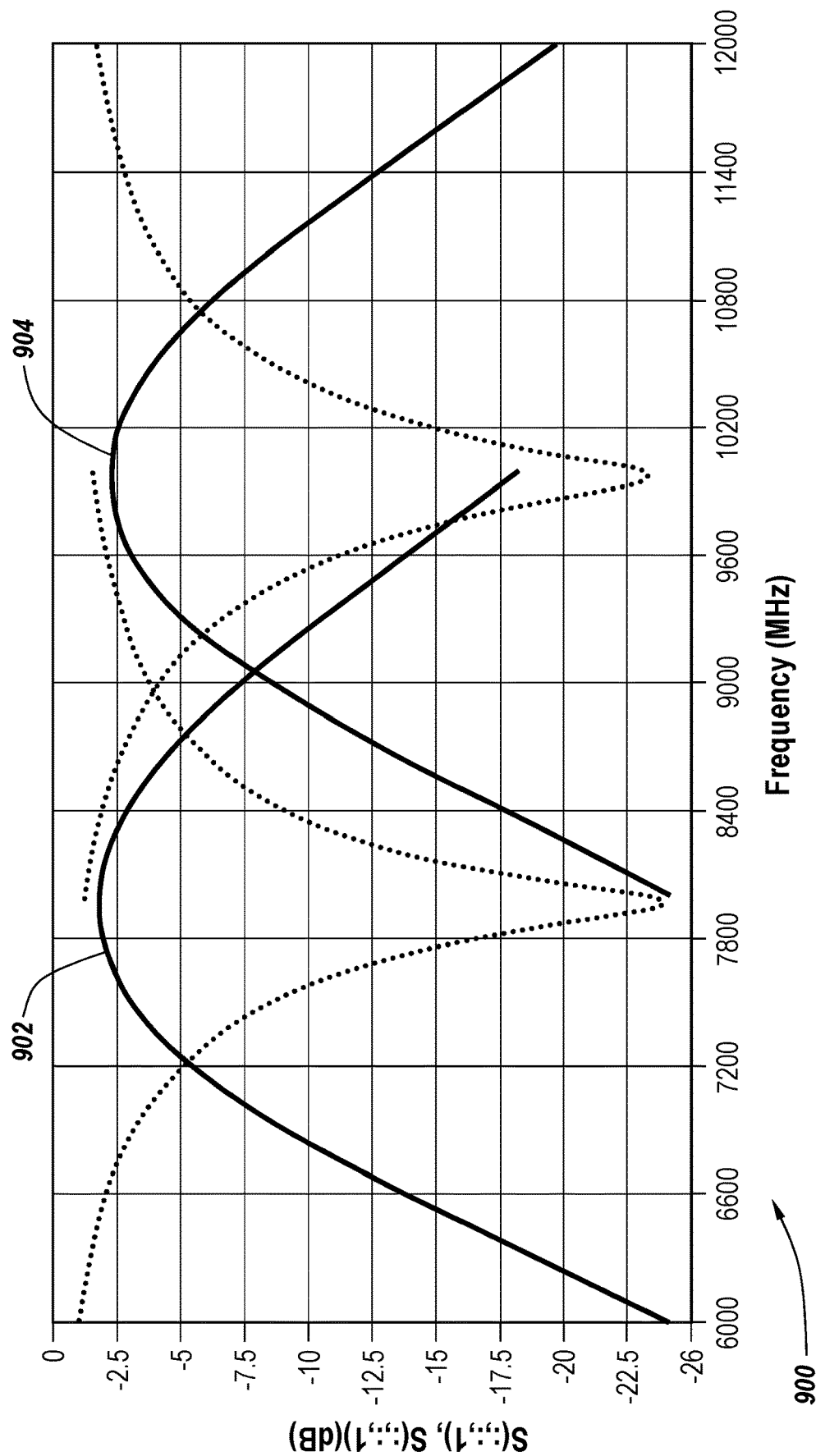
FIG. 9 depicts an example of the Gaussian passband response and return loss for different RF detection channels at different frequencies in the exemplary embodiment.

FIG. 9 shows an example of a plot 900 illustrating an exemplary passband response for the receiver in exemplary embodiments. The plot 900 shows curves 902 and 904 centered at different frequencies that have slightly different amplitudes. The curves 902 and 904 may represent the filtered signal pulse in respective channels. In this example the bands are separated by 2 GHz at the center frequency of the passband.

Figure 10:
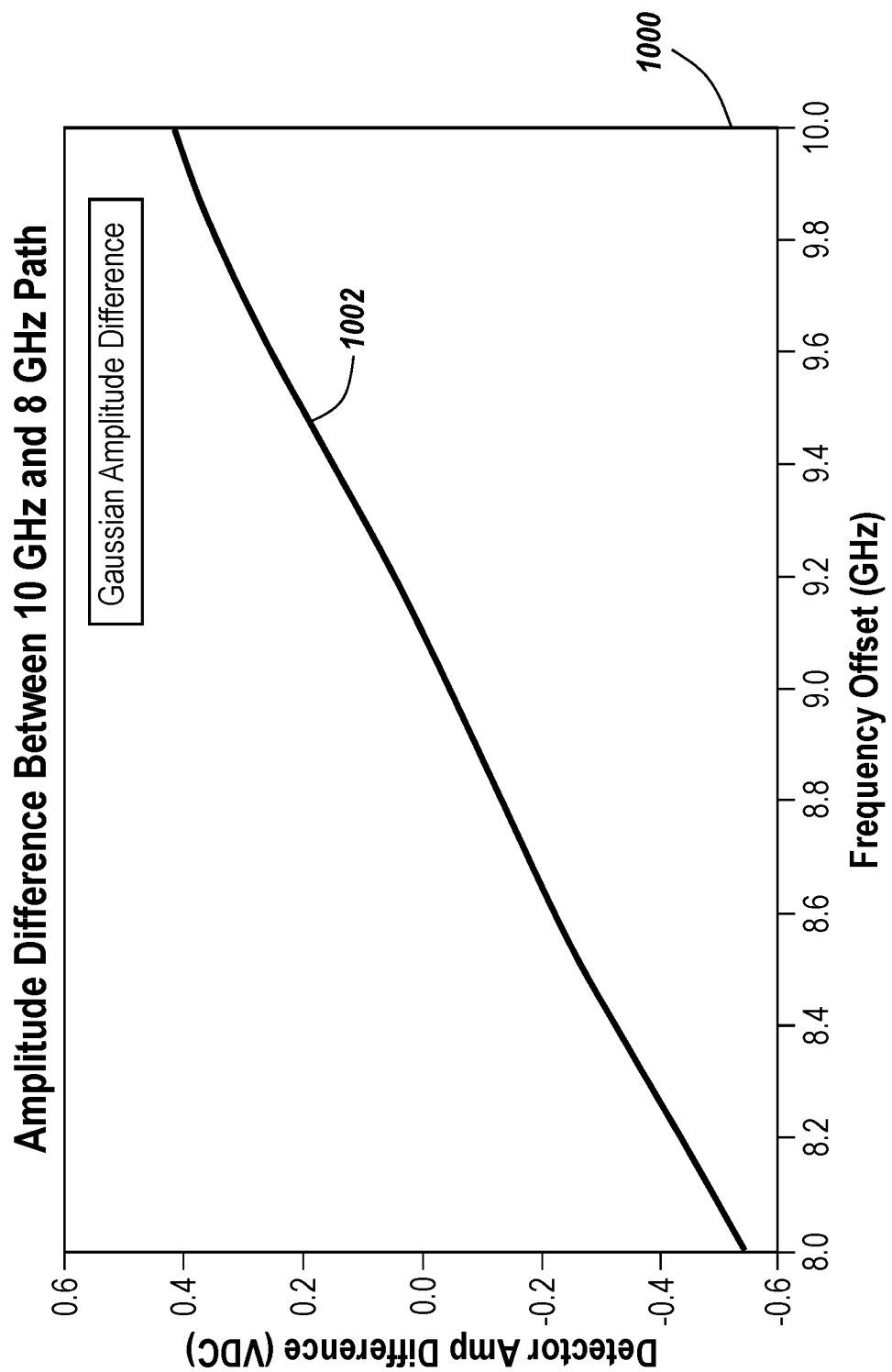
FIG. 10 is a graph depicting the relationship between detected amplitude difference between Gaussian channels vs. frequency between Gaussian channels.

FIG. 10 shows a plot of log amplitude difference for the 10 gigahertz path and the 8 gigahertz channel path. As can be seen, the detected amplitude difference plot relative to frequency offset provides a largely linear curve 1002 on the plot 1000. Thus there is a fixed relationship so that the amplitude differences may be used to determine the frequency of the pulse. The depiction in FIG. 10 results in a final slope of 0.025 volts per decibel. When used in exemplary embodiments this may adjusted by the video gain applied after the SDVLAs 510 and 514 as shown in FIG. 5. As can be seen in FIG. 10, there is a full range amplitude difference of roughly 0.95 Volts. The frequency of the pulse can be determined based on the amplitude difference between channels. In this case, the 10.4 GHz and 10.8 GHz LFM signal can be measured accurately to within 35 MHz to 50 MHz depending on the accuracy of the calibration file and received amplitude. The information in the plot, such as shown in FIG. 10, may be stored in tabular form, such as a in a look up table for fast estimation.

Figure 11:
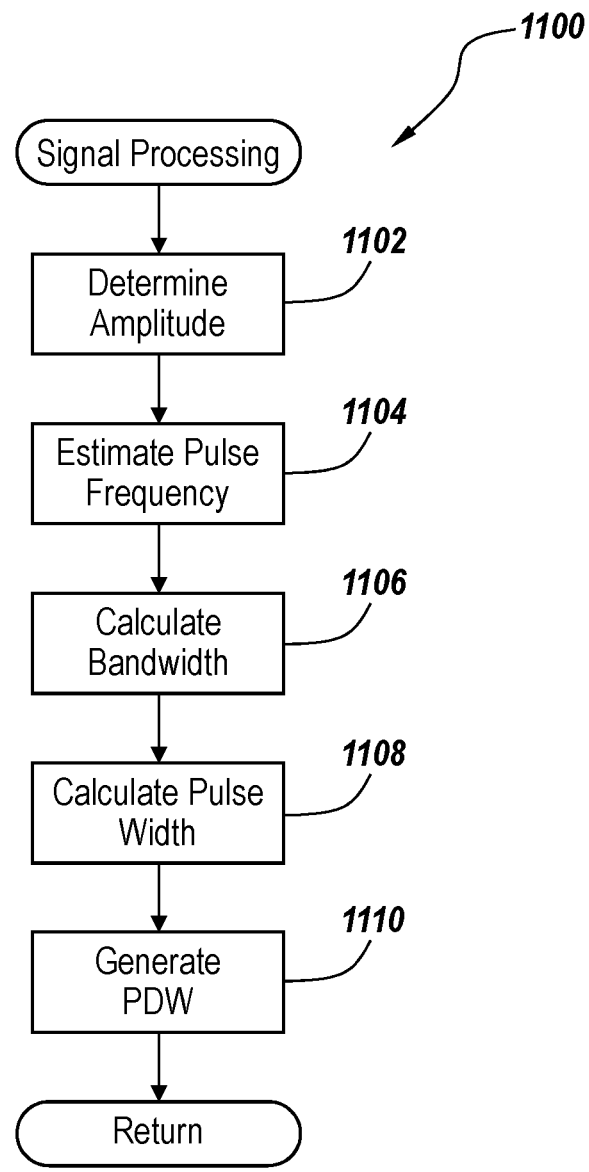
FIG. 11 is a flowchart illustrating the steps that are performed in signal processing in exemplary embodiments described herein.

FIG. 11 is a flowchart illustrating steps performed by the signal processing component 106 (FIG. 1). As shown in the flowchart 1100, the amplitude of the pulse in the respective channels is determined in step 1102. As discussed above, the amplitude difference may be used to determine the pulse frequency and is used to estimate the pulse frequency (step 1104). These values may be pre-calculated and stored in a lookup table that may be accessed for quick estimation. Alternatively, the processing logic may calculate on the fly the estimated of the pulse frequency based upon the amplitude difference.

Figure 12:
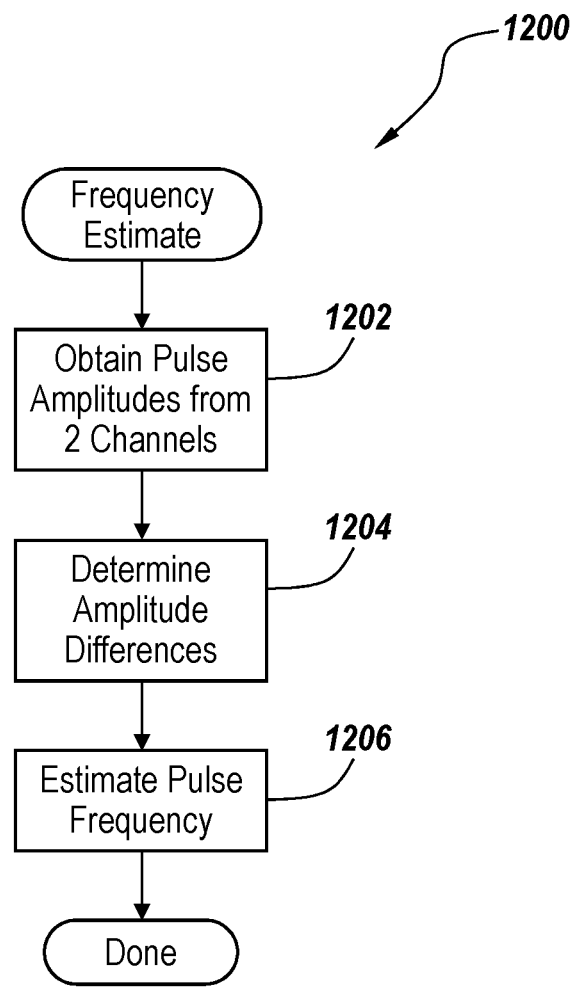
FIG. 12 is a flowchart illustrating the steps performed to estimate pulse frequency in an exemplary embodiment.

FIG. 12 provides more detail regarding the frequency estimate. As shown in the flowchart 1200, the pulse amplitudes are obtained from two channels (step 1202). Ideally, the two channels are chosen that have the most pulse energy, as it is likely that the pulse is located between the two center points of channel in the frequency domain. Amplitude differences for the pulse in the channels are determined (step 1204). Based on the amplitude differences, the pulse frequency may be estimated (step 1206). The relationship is linear, and thus the offset relative to the center point of the respective bandpass filters for the respective channels may be calculated to estimate the pulse frequency. Intra-pulse modulation is detected (step 1208).

Returning to FIG. 11, the signal processing unit also can calculate the pulse bandwidth of linear non-linear frequency modulated radar signals (step 1106). The pulse bandwidth may be detected by identifying a leading edge and a trailing edge of the pulse and then taking the differential between the leading and trailing edge in the frequency domain during a pulse event. This produces a measurement of the bandwidth of the pulse and an indication that wideband modulation may be used during a pulse event leading to enhanced signal convergence and faster pulse sorting methods.

The signal processing component may also calculate the pulse width by identifying the leading and trailing edge of the pulse (step 1108). The pulse width may be calculated as the difference in the time domain between the leading and trailing edge.

The signal processing component may generate a pulse descriptor word (PDW) to carry information that characterizes the pulse (step 1110).

While the present invention has been described with reference to exemplary embodiments herein, those skilled in the art will appreciate that various changes in form and detail may be made without departing from the intended scope of the invention as defined in the appended claim 1.

What is claimed as new and desired to be protected by Letters Patent of the United States is:

1. A method for detecting frequency of a pulse in a radar signal, comprising:
   receiving the radar signal containing the pulse at a receiver;
   at the receiver, dividing the received radar signal into channels;
   applying a respective Gaussian bandpass filter to the signal in each channel to produce a filtered signal in each channel, wherein each Gaussian bandpass filter is centered at a different frequency from the other bandpass filters;
   for at least two of the channels, detecting the pulse in the filtered signals in the channels, including an amplitude of the pulse in the filtered signals; and
   based on differences in the amplitudes of the pulses detected for the filtered signals in the at least two channels, estimating a pulse frequency of the pulse in the received radar signal.

2. The method of claim 1 where the estimating comprises obtaining a value from a look up table.

3. The method of claim 1 wherein the estimating comprises estimating the pulse frequency with a processor that is programmed to perform the estimating.

4. The method of claim 1 further comprising passing the received radar signal through a high pass filter.

5. The method of claim 1 further comprising passing the received radar signal through a radio frequency limiter.

6. The method of claim 1 further comprising estimating pulse width of the pulse.

7. The method of claim 1 further comprising generating a pulse descriptor word for the pulse.

8. The method of claim 1 further comprising determining an instantaneous bandwidth for a received linear or non-linear LFM signal.

9. The method of claim 1 wherein the received radar signal is received from a phased array antenna or antenna element(s) coupled to the receiver.

10. The method of claim 1 wherein the received radar signal is received from a squinted antenna array coupled to the receiver.

11. A radar detector system, comprising
   a channelized radar receiver for receiving an input radar signal having a pulse and for dividing the input radar signal into channels;
   each channel having a path containing Gaussian bandpass filter, wherein each of the Gaussian bandpass filters for the channels is centered at a different frequency;
   an extended range SLDVA or log detector for detecting the signals in the channels to produce a video output; and
   processing logic for receiving the video outputs from the detectors, detecting amplitudes of the pulses in the channels, calculating amplitude differences of the detected pulses in the different channels and estimating the frequency of the pulse in the received input radar signal based on the amplitude difference against a calibrated look-up table to estimate pulse frequency.

12. The radar detection system of claim 11 wherein the processing logic includes a field programmable gate array, an application specific circuit, a microprocessor, a digital signal processor or electronic circuitry.

13. The radar detector system of claim 11 further comprising a high pass filter for filtering the input radar signal.

14. The radar detection system of claim 11 further comprising a limiter applied to the input radar signal.

15. The radar detection system of claim 11 wherein the detector comprises at least two successive detection log amplifiers.

16. The radar detector system of claim 11 wherein the processing logic calculates a pulse width of the pulse in the input radar signal.

17. The radar detection of claim 11 wherein the processing logic calculates the instantaneous bandwidth of a linear or non-linear LFM t radar system signal.

* * * * *